United States Patent Office 3,161,114
Patented Dec. 15, 1964

3,161,114
PROCESS FOR TREATING SURFACES
Clifford V. Wittenwyler, Union, N.J., assignor to Shell Oil
Company, a corporation of Delaware
No Drawing. Filed Oct. 7, 1957, Ser. No. 688,438
3 Claims. (Cl. 94—22)

This invention relates to a process for treating surfaces. More particularly, the invention relates to a process for treating surfaces, and particularly roadway surfaces, to render them skid resistant and to the resulting treated surfaces.

Specifically, the invention provides a new and efficient process for treating surfaces, and especially concrete roadways, to render them resistant to skidding which comprises applying to the surface a coating of a composition comprising a mixture of a polyepoxide possessing at least one vic-epoxy group, a flexibilizing agent containing at least 10 carbon atoms, and at least 40% by weight of the combined mixture of small inert particles, and allowing the mixture to set. The invention also provides the new non-skid surfaces prepared by this process.

There is a growing need for a cheap surfacing composition that can be applied to concrete, both Portland cement and bituminous, as well as to exposed metal in bridges, etc. to reduce their tendency to skid when wet. In the case of the asphalt surfaces, there is also a need for coatings which would improve resistance to solvents and other chemicals. This is particularly urgent in the case of asphalt runways for jet aircraft as the jet fuels readily attack asphalt surfaces. In view of the increased cost of resurfacing and rebuilding roads and runways, it would also be desirable to have a coating which would help reduce the destruction of the road and runway due to wear, rain, reicing salts and cold weather.

Various coatings have been suggested for this purpose, but they have all possessed certain defects which have prevented their use on large commercial scale. In many cases, the coatings failed to have the necessary adhesion to the grit, concrete, asphalt and metal surfaces, particularly if they were oily or dirty. In other cases, the coatings failed to stand up under inclement weather conditions. In still other cases, the coatings failed to have the necessary resistance to solvent and chemicals and failed to have the desired wear and non-skid properties. In other cases, the coatings did not have the necessary distensibility and when applied to large surfaces as in the case of roadways were easily cracked.

It is an object of the invention, therefore, to provide a process for treating surfaces. It is a further object to provide a new process for treating surfaces, and especially roadway surfaces, to render them non-skid. It is a further object to provide a new process for treating surfaces to render them non-skid which also imparts excellent resistance to wear, rain and cold weather. It is a further object to provide a new process for treating surfaces to render them non-skid which also imparts excellent resistance to solvents, deicing salts and acids. It is a further object to provide a new process for treating surfaces which gives coatings having good distensibility and resistance to cracking. Other objects and advantages of the invention will be apparent from the following detailed description thereof.

It has now been discovered that these and other objects may be accomplished by the process of the invention which comprises applying to the surface a composition comprising a mixture of a polyepoxide having at least one vic-epoxy group, a flexibilizing agent containing at least 10 carbon atoms, and at least 40% by weight of the combined mixture of small inert particles, and allowing the mixture to set. It has been found that this process gives a coating which has excellent resistance to skidding. The non-skid coatings prepared by this process have good adhesion to the roadway surfaces and have unexpectedly good distensibility. Further, the coatings showed good resistance to hot and cold weather and have good resistance to solvents, deicing salts, acids and various types of jet fuels. The coatings are particularly attractive in that they may be applied to old or new roads or runways and set up quickly without the use of any special curing conditions. As noted hereinafter, the process is applicable not only for the treatment of highway road surfaces, but are equally valuable for coating of dock areas, warehouse floors, sidewalks, tennis courts, ship decks and the like where the non-skid weather resistant properties are desired.

The polyepoxide materials to be added to the compositions of the invention comprise those organic materials having more than one vic-epoxy group, i.e. more than one

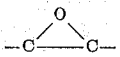

group. The polyepoxides may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U.S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material, may, for example, have epoxy equivalent values, such as 1.5, 1.8, 2.5 and the like.

Examples of the polyepoxides include, among others, 1,4 - bis(2,3 - epoxypropoxy)benzene, 1,3 - bis(2,3-epoxypropoxy)benzene, 4,4'-bis-(2,3 - epoxypropoxy)diphenyl ether 1,8-bis(2,3-epoxypropoxy)octane, 1,4-bis(2,3-epoxypropoxy)cyclohexane, 4,4'-bis(2 - hydroxy-3,4'-epoxybutoxy)diphenyl dimethylmethane, 1,3 - bis(4,5-epoxypentoxy)-5-chlorobenzene, 1,4-bis(3,4-epoxybutoxy)-2-chlorocyclohexane, 1,3 - bis(2-hydroxy-3,4-epoxybutoxy)benzene, 1,4-bis and (2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)-propane (Bisphenol-A), 2,2-bis(hydroxyphenyl)butane, 4,4' - dihydroxybenzophenone, bis - (4 - hydroxyphenyl) ethane, 2,2-bis(4-hydroxyphenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monmer products produced by this method from dihydric phenols and epichlorohydrin may be represented by the general formula

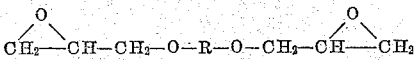

wherein R represents a divalent hydrocarbon radical of the dihydric phenol. The polymeric products will generally not be a single simple molecule but will be a complex mixture of glycidyl polyethers of the general formula

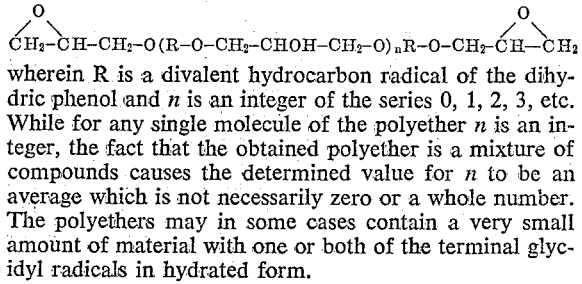

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

*Polyether A.*—1 mol of bis-phenol was dissolved in 10 mols of epichlorohydrin and 1 to 2% water added to the resulting mixture. 5% by weight phenol was added to the mixture. The combined mixture was then placed in a kettle provided with heating and cooling means, agitator, distillation condenser and receiver. The mixture was brought to 80° C. and 2 mols of solid sodium hydroxide added in small portions. Sufficient cooling is applied during the addition so that the temperature is maintained at about 95–97° C. and there is a gentle distillation of epichlorohydrin and water. After the last addition of sodium hydroxide with the completion of the reaction, the excess epichlorohydrin is removed by vacuum distillation. After completion of the distillation, the residue is cooled to about 90° C. and about 300 parts of benzene added. cooling drops the temperature of the mixture to about 40° C. with precipitation of salt from the solution. The salt is removed by filtration and the removed salt carefully washed with about an additional 300 parts of benzene to remove polyether therefrom. The two benzene solutions were combined and distilled to separate the benzene. When the kettle temperature reaches 125° C., vacuum is applied and distillation. The resulting product is a liquid composition containing glycidyl polyether of bisphenol having the following properties: Epoxy value of 0.541 eq./100 g., color 6 (Gardner), chlorine (percent w.) 0.24, viscosity 70 poises.

*Polyether B.*—A solution consisting of 11.7 parts of water, 1.22 parts of sodium hydroxide, and 13.38 parts of 2,2-bis(4-hydroxyphenyl)propane was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at a temperature of 20° C. to 30° C. was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durran's Mercury Method and a molecular weight of 483. The product had an epoxy value eq./100 g. of 0.40. For convenience, this product will be referred to as Polyether B.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 300 and 900. Particularly preferred are those having a Durran's Mercury Method softening point no greater than 80° C.

The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

Another group of polyepoxides that may be used in preparing the emulsions comprises the glycidyl ethers of novalac resins which resins are obtained by condensing an aldehyde with a polyhydric phenol. A typical member of this class is the epoxy resin from formaldehyde 2,2-bis(4-hydroxyphenyl)-propane novalac resin.

A further group of polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy ketones, halogenated polyhydric alcohols, and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)dimethylmethane, 1,4-dimethylol benzene, 4,4'-dimethyloldiphenyl, dimethyloltoluenes, and the like.

Particularly preferred members of this group comprise the glycidyl polyethers of aliphatic polyhydric alcohols containing from 2 to 10 carbon atoms and having from 2 to 6 hydroxyl groups and, more preferably, the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Another group of polyepoxides includes the epoxy esters of polybasic acids, such as diglycidyl phthalate and diglycidyl adipate, diglycidyl tetrahydrophthalate, diglycidyl maleate, epoxidized dimethyllylphthalate and epoxidized dicrotyl phthalate.

Other polyepoxide compounds include the polymers and copolymers of the epoxy-containing monomers possessing at least one polymerizable ethylenic linkage, such as, for example, allyl glycidyl ether and glycidyl methacrylate. When this type of monomer is polymerized in the substantial absence of alkaline or acidic catalysts, such as in the presence of heat, oxygen, peroxy compound, actinic light, and the like, it undergoes additional polymerization at the multiple bond leaving the epoxy group unaffected. These monomers may be polymerized with themselves or with other ethylenically unsaturated monomer, such as styrene, vinyl acetate, methacrylonitrile, acrylonitrile, vinyl chloride, vinylidene chloride, methyl acrylate and methyl methacrylate.

These polymers are preferably prepared by heating the monomer or monomers in bulk or in the presence of an inert solvent, such as benzene, in the presence of air or a peroxy catalyst, such as ditertiarybutyl peroxide, at temperatures ranging from 75° C. to 200° C.

Other examples include those polyepoxides having one or more internal epoxy groups, such as vinyl cyclohexene dioxide, epoxidized unsaturated esters as epoxidized tetrahydrobenzyl tetrahydrobenzoate, epoxidized dicrotyl phthalate, epoxidized 2,2 - bis(cyclohexenyl)propane, epoxidized ethylene glycol dicyclohexenecarboxylate and the like.

In addition to the polyepoxides described above, flexibilizing agents possessing at least 10 carbon atoms are added to the compositions. Examples of these materials include, among others, pine oil, pine oil distillates, lignite tar, polythiopolymercaptans, polyamides, chlorinated aromatics, polyesters, monomeric phthalate esters, long chain acids, long chain epoxy-containing materials, and mixtures thereof.

One preferred group comprises the polythiopolymercaptans obtained by treating polymercaptans with agents, such as hydrogen peroxide or sodium peroxide. Polymers of the formula

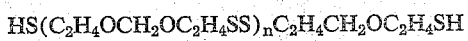

wherein $n$ is 1 to 50 may be obtained, for example, by reacting dimercapto diethyl formal with hydrogen peroxide. A more detailed description of the preparation of this type of polymer may be found in Patrick—U.S. 2,466,963. Polythiopolymercaptans useful in the process of the invention may also be prepared by reacting an organic dihalide with sodium polysulfide to form a high molecular weight polymer containing a plurality of disulfide linkages and then depolymerizing or degrading that polymer, preferably by treating a water dispersion of the polymer with sodium hydrosulfide and sodium sulfite. The molecular weight of the resulting polythiopolymercaptan may be controlled by regulating the proportions of reactants. A more detailed description of the preparation of these polymers may be found in Patrick—U.S. 2,466,963.

Polythiopolymercaptans having molecular weights below about 20,000 and preferably below 12,000 are generally preferred. Particularly preferred polythiopolymercaptans are the liquid polythiopolymercaptans having a molecular weight between 300 and 6000.

Another preferred group comprise polyamide resins. Preferred members of this group comprise the polyamides of aliphatic polyamines and aliphatic or cycloaliphatic polybasic acids, and especially polymeric fatty acids. Examples of aliphatic polyamines that may be used for this purpose include ethylene diamine, diethylene triamine, triethylene tetramine, tetraethylene pentamine, 1,4-diaminobutane, 1,3-diaminobutane, hexamethylene diamine, 3-(N-isopropylamino)propylamine, and the like. Examples of aliphatic and cycloaliphatic polybasic acids that may be used include adipic acid, sebacic acid, succinic acid, glutaric, pimelic, suberic, azelaic, and polymeric fatty acids, such as obtained by dimerizing and trimerizing fatty acids obtained from oils, such as soybean, linseed, tung, perilla, oiticica, cottonseed, corn, tall, sunflower safflower, dehydrated castor oil, and the like.

Especially preferred polyamides are those derived from the aliphatic polyamines containing no more than 12 carbon atoms and polymeric fatty acids obtained by dimerizing and trimerizing ethylenically unsaturated fatty acids containing up to 24 carbon atoms. These preferred polyamides preferably have molecular weights between 800 and 15,000 and have a viscosity of 50 to 750 poises at 40° C.

It is possible to prepare polyamides terminated in carboxyl groups or amine groups or terminated in both carboxyl and amine groups. As amine groups are effective curing agents for the polyepoxides, it is sometimes preferred to utilize polyamides terminated in amino groups.

The preparation of polyamides is illustrated in U.S. 2,450,940.

Another prefered group of flexibilizing agents comprise polyesters, such as those prepared from polybasic acids and dihydric alcohols. Examples of acids that may be used for this purpose include maleic acid, sebasic acid, adipic acid, succinic acid, glutaric acid, pimelic acid, phthalic acid, terephthalic acid, chlorophthalic acid, tetrahydrophthalic acid, and the like. Examples of dihydric alcohols include, among others, ethylene glycol, diethylene glycol, hexamethylene glycol, 1,5-pentanediol, 1,8-octanediol, tetraethylene glycol, and the like, and mixtures thereof.

Preferred polyesters to be employed are the polyesters prepared from aliphatic dicarboxylic acids containing up to 15 carbon atoms and dihydric alcohols containing up to 10 carbon atoms. It is possible to prepare polyesters which are terminated in OH or carboxyl groups or both as the carboxyl groups assist in the cure of the polyepoxide, it is sometimes preferred to use the acid terminated polyesters.

Another preferred group comprises acids and polyamines having at least 12 carbon atoms, such as dimerized and trimerized ethylenically unsaturated fatty acids, such as those described above for the preparation of polyamides, 1,18-octadecanedioic acid, 1,20-eicosadienedioic acid, and the like, and octadecane mono- and diamines, eicosadiene diamines, and tetradecane diamine, as well as the Duomeen type polyamines which are obtained by reacting higher monoamines, such as $C_{18}$ amines with acrylonitrile and then reducing the nitrile group to amine group.

Another preferred group of flexibilizers include the long chain monoepoxy compounds, such as the glycidyl ester of long chain fatty acids, and preferably those containing at least 18 carbon atoms, as used as glycidyl ethers of phenols substituted with long side chains which preferably contain from 10 to 25 carbon atoms.

Another group comprises the monomeric esters of monohydric alcohols and polybasic acids, such as the dialkyl phthalates, as dioctyl phthalate, dialkyl sebacates, etc.

Especially preferred as flexibilizing agents are the products such as pine oil, and lignite tar.

A portion, e.g. up to 80% of the flexibilizing agent can be replaced with other inexpensive materials, such as coal tars, refined coal tars, aliphatic materials, bitumens and the like.

The small particles present in the compositions used in the process of the invention may be particles of any inert solid material. The particles should be rather finely divided and preferably have a mesh size varying from 4 to 200. Preferred materials include sand, finely divided rocks, finely divided shells, crushed quartz, aluminum oxide, and the like. Particularly preferred are the mineral, and especially the siliceous materials, such as, for example, sand and crushed rock. Mixtures of various types of particles may also be used.

The amount of the polyepoxide, flexibilizing agent and inert material in the composition may vary depending upon the properties desired in the resulting product. Compositions giving the above-described unexpected properties, such as good adhesion and distensibility and improved weather resistance and solvent resistance, are obtained when the polyepoxides and flexibilizing agents are combined in a weight ratio varying from about 10:1 to 1:10. Particularly good results are obtained when the polyepoxides and flexibilizing agents are combined in weight ratios varying from about 1:2 to 1:0.1.

The amount of the inert particles present in the composition should be at least 40% by weight of the total mixture of polyepoxide and flexibilizing agent and should preferably be between 70% and 1000% by weight of the total mixture, and still more preferably between 200% and 400%.

The compositions may be prepared by any suitable method. The polyepoxide and flexibilizing agent are preferably both liquids and in that case the compositions may be prepared by simply mixing the two components together with or without the application of heat. If one or more of the components are thick liquids or solids, it is generally preferred to heat them before or during the mixing. Various solvents or diluents which will evaporate before or during cure may be added to assist in the preparation of the mixture, but the addition of these materials is not generally desirable as it usually lengthens the time of cure of the finished product. Suitable solvents include alcohols, such as isopropyl, butyl and amyl alcohol; ketones, such as acetone, methyl ethyl ketone, methyl isobutyl ketone, isophorone; esters, such as ethyl acetate, butyl acetate, Cellosolve acetate (ethylene glycol monoacetate); hydrocarbons, such as xylene, benzene, and the like; cyano-substituted hydrocarbons, such as propionitrile, adiponitrile, acetonitrile, acrylonitrile, and the like, and mixtures thereof. It is also convenient in some cases where employing solid polyepoxides to employ liquid polyepoxides, such as normally liquid glycidyl polyethers of polyhydric alcohols, as the diluent.

The inert particles may be added to the composition before it is applied to the desired surface. In coating highway surfaces, the polyepoxide-flexibilizing agent-inert particle mixture may be applied directly to the road surface and then additional inert particles, such as sand, may then be sprinkled onto the coating before it is cured and the coating rolled to improve compaction.

The composition of the invention is cured by the action of a curing agent. In some cases, the flexibilizing agent will possess active hydrogen and may act as the curing agent. In other cases, it will be necessary to add a curing agent. The epoxy curing agents that may be used may be acidic, neutral or alkaline. Examples of the curing agents include, among others, alkalies like sodium or potassium hydroxides; alkali phenoxides like sodium phenoxide; carboxylic acids or anhydrides, such as formic acid, oxalic acid or phthalic anhydride; dimer or trimer acids derived from unsaturated fatty acids, 1,20-eicosanedioic acid, and the like. Friedel-Crafts metal halides like aluminum chloride, zinc chloride, ferric chloride; salts, such as zinc fluoborate, magnesium perchlorate and zinc fluosilicate; phosphoric acid and partial esters thereof including n-butyl ortho-phosphate, diethyl ortho-phosphate and hexaethyl-tetraphosphate; amino compounds, such as, for example, ethylene diamine, diethylene triamine, triethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N,N-diethyl-1,3-propane diamine, 1,2 - diamino - 2 - methylpropane, 2,3-diamino-2-methylbutane, 2,4-diamino-2-methylpentane, 2,4-diamino-2,6-dimethyloctane, dibutylamine, dioctylamine, dinonylamine, distearylamine, diallylamine, dicyclohexylamine, methylethylamine, ethyl cyclohexylamine, o-tolynaphthylamine, pyrrolidine, 2-methylpyrrolidine, tetrahydropyridine, 2-methylpiperidine, 2,6-dimethylpiperidine, diaminopyridine, tetramethylpentane, meta-phenylene diamine, and the like, and soluble adducts of amines and polyepoxides and their salts, such as described in U.S. 2,651,589 and U.S. 2,640,037.

Preferred curing agents are the polycarboxylic acid anhydrides, the primary and secondary aliphatic, cycloaliphatic and aromatic amines and adducts of the amines and polyepoxides.

The amount of the curing agent employed will vary depending upon the type of agent selected. In general, the amount of the curing agent will vary from about 0.5% to 200% by weight of the polyepoxide. The tertiary amines and $BF_3$ complexes are preferably employed in amounts varying from about 0.5% to 20% and the metal salts are preferably employed in amounts varying from about 1% to 15%. The secondary and primary amines, acids and anhydrides are preferably employed in at least stoichiometric amounts, i.e. sufficient amount to furnish one amine hydrogen or one carboxyl group or anhydride group for every group, and more preferably stoichiometric ratios varying from 1:1 to 1:1.5.

The curing agents may be added to the compositions at any time. It is generally preferred to prepare the polyepoxide-flexibilizing agent compositions and the curing agents as separate packages and then mix the two just before application to the desired surface. The curing agent may also be sprayed or otherwise applied to the coating after it has been applied to the desired surface, but this procedure is less preferred.

The compositions of the invention may be applied to any surface but are particularly suitable for use as surfacing compositions for Portland cement or bituminous concrete, wood and steel. The concrete may be of any of the usual types such as may be prepared from hydraulic cements, such as Portland cement, and other types as aluminous and oxy salt type cements. The asphalt surfaces may be those prepared from straight run asphalts or further refined or modified asphalts. The compositions may be applied in very thin coatings or in very thick coatings, e.g. $1/16$ inch up to $1/2$ or 1 inch coatings.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

Cement concrete referred to in the examples was prepared from Portland cement, aggregate and water. The bituminous concrete was prepared from straight run asphalt and aggregate.

*Example I*

This example illustrates the use of the process of the invention in applying a non-skid coating to Portland cement concrete.

100 parts of polyether A and 50 parts of pine oil distillate boiling at 213° C. to 222° C were mixed together. 15 parts of diethylene triamine was then added and 80 parts of the resulting mixture combined with 80 parts of crushed quartz.

This mixture was spread (at the rate of about 2 lbs. per square yard) on Portland cement concrete panels and then addition crushed quartz pressed onto the top of the coating. In a short period at room temperature, the compositions set up to very hard rough skid-resistant coatings. The coating had good distensibility and good resistance to change in weather as shown by tests wherein the coated concrete blocks were subjected to wide changes in temperature and placed in contact with water.

Samples of the above composition were also placed on portions of well traveled Portland cement highways in the Eastern United States. These test samples showed good adhesion and distensibility and no tendency to crack and peel off. Portland cement concrete roadways treated with compositions containing only the Polyether A, however, have tended to crack on and peel off after being exposed to heavy traffic.

*Example II*

100 parts of Polyether A and 50 parts of lignite tar (tar produced by low temperature carbonization of lignite) were mixed together. 15 parts of diethylene triamine was then added and 80 parts of the resulting mixture combined with 80 parts of crushed quartz.

This mixture was spread (at the rate of about 2 lbs. per square yard) on Portland cement concrete panels and then additional crushed quartz pressed on the top. In a short period at room temperature, the composition set up to very hard rough coating. The coating had good adhesion and distensibility and resistance to jet fuels as shown by tests wherein the coated concrete blocks were subjected to wide change in temperature and placed in contact with water.

The above compositions are also useful for treating Portland cement concrete highways.

*Example III*

100 parts of Polyether A and 50 parts of chlorinated bisphenyl were combined. 10 parts of diethylene triamine was then added.

The mixture is then applied at a rate of about 1.5 lbs. per square yard on a Portland cement concrete surface with brooms and/or rollers. After an even layer is applied, additional crushed quartz is sprinkled over the surface and rolled with a lawn roller to gain greater compaction. After hardening is complete, the excess grit is swept off. A concrete roadway treated in this manner shows good skid resistance, good adhesion and distensibility. The coating also displays good wear resistance and good resistance to solvents and cold weather.

*Example IV*

This example illustrates the use of the process of the invention in treating concrete roadway with a composition containing Polyether A and a long chain polyamine (Duomeen S obtained by reacting acrylonitrile with a n-$C_{18}$ primary amine and reducing the nitrile group to amine).

100 parts of Polyether A and 70 parts of the melted Duomeen S were combined together. 80 parts of the resulting mixture was combined with 80 parts of crushed quartz.

This mixture was spread at the rate of about 2 lbs. per square yard to concrete highway and crushed quartz was applied to the top of the coating and rolled with a lawn roller as in the preceding example. The coating cured well at atmospheric temperature (about 20° C.) to form a strong adhesive coating which had good distensibility and good skid resistance.

Related results are obtained by changing the amount of Duomeen S and diethylene triamine to the following

| Duomeen S: | Diethylene triamine |
|---|---|
| 10 | 7.4 |
| 20 | 6.5 |
| 40 | 2.7 |

*Example V*

This example illustrates the use of the process of the invention in treating a Portland cement concrete highway with a composition containing Polyether A and a liquid polythiopolymercaptan having a molecular weight of about 4000 and prepared by reacting dichloroethyl formal and about 2% trichloropropane with sodium polyepoxide and then depolymerizing as noted above.

100 parts of Polyether A and 50 parts of the polythiopolymercaptan was combined together. 10 parts of diethylene triamine was then added and 80 parts of the resulting mixture combined with 80 parts of crushed quartz.

This mixture was spread at the rate of about 10 lbs. per square yard to Portland concrete highway and crushed quartz was applied to the top of the coating and rolled as in the preceding example. The coating cured well as outside temperature to form a strong adhesive coating which had good distensibility and good skid resistance.

Related results are obtained by changing the ratio of Polyether A to polythiomercaptan to 100:100, 100:25 and 100:75.

*Example VI*

This example illustrates the use of the process of the invention in treating concrete roadway with a composition containing an acid terminated polyester and Polyether A.

100 parts of Polyether A and 50 parts of a sebacic-maleic anhydride-ethylene glycol acid terminated polyester were combined together. 10 parts of diethylene triamine was then added and 80 parts of the resulting mixture recombined with 80 parts of crushed quartz.

This mixture was spread at the rate of about 10 lbs. per square yard to Portland cement concrete highway and crushed quartz was applied to the top of the coating and rolled with a lawn roller as in the preceding example. The coating cured well at outside temperature to form a strong adhesive coating which had good distensibility and good skid resistance.

*Example VII*

This example illustrates the use of the process of the invention in treating concrete roadway with a composition containing Polyether A and a glycidyl ether of a phenol having a $C_{18}$ unsaturated side chain.

100 parts of Polyether A and 50 parts of the glycidyl ether described above were combined together. 13.4 parts of diethylene triamine was then added and 80 parts of the resulting mixture combined with 80 parts of crushed quartz.

This mixture was spread at the rate of about 10 lbs. per square yard to Portland cement concrete highway and crushed quartz was applied to the top of the coating and rolled with a lawn roller as in the preceding example. The coating cured well at outside temperature to form a strong adhesive coating which had good distensibility and good skid resistance.

Related results are obtained by changing the ratio of Polyether A to glycidyl ether to 100:25, 100:100 and 100:75.

*Example VIII*

This example illustrates the use of the process of the invention in treating a Portland cement concrete roadway with a composition containing Polyether A and a polyamide of dimerized soyabean oil fatty acids and ethylene diamine having a viscosity of 100±20 poises at 40° C.

100 parts of Polyether A and 50 parts of the polyamide were combined together. 80 parts of the resulting mixture was combined with 80 parts of crushed quartz.

This mixture was spread at the rate of about 2 lbs. per square yard to Portland cement concrete highway and crushed quartz was applied to the top of the coating. The coating cured well to form a strong adhesive coating which had good distensibility and good skid resistance.

*Example IX*

Examples I to VIII were repeated with the exception that 30 mesh aluminum oxide was used in place of the crushed quartz. Excellent non-skid coatings were obtained.

*Example X*

Example I is repeated with the exception that refined coal tar is added along with the flexibilizing agent. Excellent non-skid coatings were also obtained.

*Example XI*

Examples I to VIII were repeated with the exception that the following catalysts were used in place of the diethylene triamine: ethylene diamine, hexamethylene diamine and tetraethylene pentamine.

*Example XII*

This example illustrates the process of the invention in treating concrete roadways with a composition containing Polyether A and the dimerized fatty acid of soyabean oil.

100 parts of Polyether A, 75 parts of dimerized soyabean oil and 1% of methyl diethanolamine are heated to 150° C. for 30 minutes to form an adduct. After cooling slightly 15 parts of toluene is added to 100 parts of the adduct and the resulting mixture catalyzed with 3 parts of diethylenetriamine and spread on the roadway surface at the rate of 1.5 lbs./sq. yard with a broom. One-eighth inch particles of silicon carbide were strewn over the wet surface. The coating cured well to form a strong adhesive coating which had excellent distensibility and skid resistance.

*Example XIII*

Examples I to XII are repeated with the exception that the coatings are applied to bituminous concrete roadways instead of Portland cement roadways. Good non-skid coatings are also obtained.

I claim as my invention:

1. A process for treating surfaces to render them non-skid which comprises applying to the surface a composition comprising a mixture of a glycidyl polyether of a dihydric phenol and pine oil, and then spreading small inert particles over the top of the layer of said material and allowing the combined mixture to set, the amount of the said inert particles making up at least 40% by weight of the combined mixture.

2. A process for treating concrete surfaces to render them non-skid which comprises applying to the surface of the concrete at a temperature between 5° C. and 100° C. a composition comprising a mixture of a polyepoxide having more than one vic-epoxy group, pine oil, an epoxy curing agent, and at least 40° by weight of the combined mixture of small inert particles, applying more inert particles to the top of the coating and then allowing the coating to set.

3. A process for treating surfaces to render them non-skid which comprises applying to the surface a composition comprising a mixture of a polyepoxide having more than one vic-epoxy group, pine oil, an epoxy curing agent, and then spreading small inert particles over the top of the layer of said composition and allowing the combined mixture to set, the amount of said inert particles making up at least 40% by weight of the combined mixture.

References Cited in the file of this patent

UNITED STATES PATENTS

| | | |
|---|---|---|
| 2,347,233 | Abernathy | Apr. 25, 1944 |
| 2,705,223 | Renfrew et al. | Mar. 29, 1955 |
| 2,707,708 | Wittcoff | May 3, 1955 |
| 2,712,535 | Fisch | July 5, 1955 |
| 2,718,829 | Seymour | Sept. 27, 1955 |
| 2,735,829 | Wiles et al. | Feb. 21, 1956 |
| 2,787,608 | Gregory et al. | Apr. 2, 1957 |
| 2,798,833 | Lapsensohn | July 9, 1957 |
| 2,889,305 | Lopata | June 2, 1959 |
| 2,934,452 | Sternberg | Apr. 26, 1960 |
| 2,943,953 | Daniel | July 5, 1960 |
| 2,948,201 | Nagin et al. | Aug. 9, 1960 |
| 2,976,256 | Whittier et al. | Mar. 21, 1961 |

OTHER REFERENCES

Rubber and Plastic Age, May 1956, pages 288, 289.

Epoxy Resins by Lees and Neville, page 165, McGraw-Hill Book Co., 1957.